United States Patent [19]

Peyret

[11] Patent Number: 4,986,107
[45] Date of Patent: Jan. 22, 1991

[54] RACK FOR ASSEMBLING, INSPECTING AND REPAIRING VEHICLE BODIES

[76] Inventor: Lucien Peyret, No. 5, 1ere Rue, Le Corbusier Les bruneaux, 42700 Firminy, France

[21] Appl. No.: 364,434
[22] PCT Filed: Oct. 5, 1988
[86] PCT No.: PCT/FR88/00492
   § 371 Date: Jul. 13, 1989
   § 102(e) Date: Jul. 13, 1989
[87] PCT Pub. No.: WO89/03504
   PCT Pub. Date: Apr. 20, 1989

[30] Foreign Application Priority Data

Oct. 6, 1987 [FR] France .................................. 87 14149

[51] Int. Cl.⁵ ............................................. B21D 1/12
[52] U.S. Cl. ...................................... 72/457; 72/705
[58] Field of Search ............. 72/705, 457; 269/289 R, 269/289 MR

[56] References Cited

U.S. PATENT DOCUMENTS

| | | | |
|---|---|---|---|
| 3,835,693 | 9/1974 | Majersky | 72/705 |
| 4,151,737 | 5/1979 | Specktor | 72/705 |
| 4,505,145 | 3/1985 | Bergstrom et al. | 72/705 |
| 4,510,790 | 4/1985 | Hare | 72/705 |
| 4,557,127 | 12/1985 | Pietrelli | 72/705 |
| 4,658,627 | 4/1987 | Brewer | 72/705 |
| 4,781,045 | 11/1988 | Celette | 72/705 |
| 4,794,783 | 1/1989 | Eck | 72/705 |

FOREIGN PATENT DOCUMENTS

| | | |
|---|---|---|
| 0180465 | 5/1986 | European Pat. Off. . |
| 2745807 | 10/1977 | Fed. Rep. of Germany . |
| 2384229 | 10/1978 | France . |
| 2432639 | 2/1980 | France . |
| 2432640 | 2/1980 | France . |
| 2511272 | 2/1983 | France . |
| 3596508 | 10/1987 | France ................................ 72/705 |
| 2626801 | 8/1989 | France ................................ 72/705 |
| 2019573 | 10/1979 | United Kingdom . |
| 2098522 | 11/1982 | United Kingdom . |
| 8303373 | 10/1983 | World Int. Prop. O. ............. 72/705 |

Primary Examiner—Robert L. Spruill
Attorney, Agent, or Firm—Eckert Seamans Cherin & Mellott

[57] ABSTRACT

A rack is disclosed for the assembly, inspection, and repairing of vehicle bodies. The rack is formed primarily of rectangular tubing and has two side members which are joined by two cross members. The side members have guide rails and grooves which allow quickly adjustable positioning of various supports and accessories. The side members and cross members have a plurality of formed holes at spaced intervals to accept locating dowels for the proper positioning of supports and base plates. The supports and base plates are mounted with a quick clamping mechanism. Also provided are clamps for holding the bodywork which have a simple height adjustment mechanism. Removable transverse ends allow good access to the interior of the rack and to the vehicle bodywork.

14 Claims, 4 Drawing Sheets

RACK FOR ASSEMBLING, INSPECTING AND REPAIRING VEHICLE BODIES

BACKGROUND OF THE INVENTION

1. Field of the Invention

The invention relates to the field of equipment for repairing and straightening deformed vehicles, especially automobiles, and to accessories used with such equipment.

2. Prior Art

The use of inspection benches or modular racks for assembling and repairing vehicle bodywork is well known. These modular racks have at least two ground supported side members either with or without rolling means. These side members have fixed cross members which provide support and positioning for various accessory components and devices used in bodywork. The side members can also be arranged so as to enable the mounting of height adjustable anchoring clamps. For example, French patent No. 2,432,748 discloses a modular rack of this type.

However, such modular racks have certain disadvantages. Their configuration may limit access to certain bodywork parts such that it is difficult or even impossible to perform a specific job. This problem is aggravated when the various accessory components and devices are mounted on the modular rack. In fact, it may not be possible to position these accessories in a different position because they have several anchoring points. At the least, it is not easy to remove or relocate the accessories as a function of the work to be performed.

Another disadvantage arises in the long and tedious process required to fix certain accessories onto the modular rack.

The invention is aimed at overcoming these disadvantages by providing a modular rack having a unique structure and special devices to enable easy access to the vehicle bodywork while enabling simple, quick and efficient mounting of the various accessories which must be fitted to the modular rack.

SUMMARY OF THE INVENTION

It is an object of the invention to provide a modular rack for the assembly, inspection and repair of vehicle bodywork.

It is another object of the invention to provide a modular rack which allows good access to all parts of the vehicle bodywork.

It is a further object of the invention to provide modular rack accessories which are easily mounted on the rack.

It is still another object of the invention to provide modular rack accessories which can be easily repositioned on the rack.

These and other objects are accomplished by a modular rack which has several key structural features. The rack has side members which form a center part and two end parts. The side members forming the center part are offset inwardly from the side members forming the end parts. Each side member has an outside face in the form of a guide rail to allow adjustable positioning of accessories. Each side member has a top face which forms a groove. The groove accepts support stirrups to enable the mounting and positioning of cross members. The rack has transverse ends which are removable to give free access to the area between the side members at the end parts.

BRIEF DESCRIPTION OF THE DRAWINGS

The invention is shown in more detail with the aid of the drawings wherein.

DETAILED DESCRIPTION OF THE PREFERRED EMBODIMENTS

Figure 1:
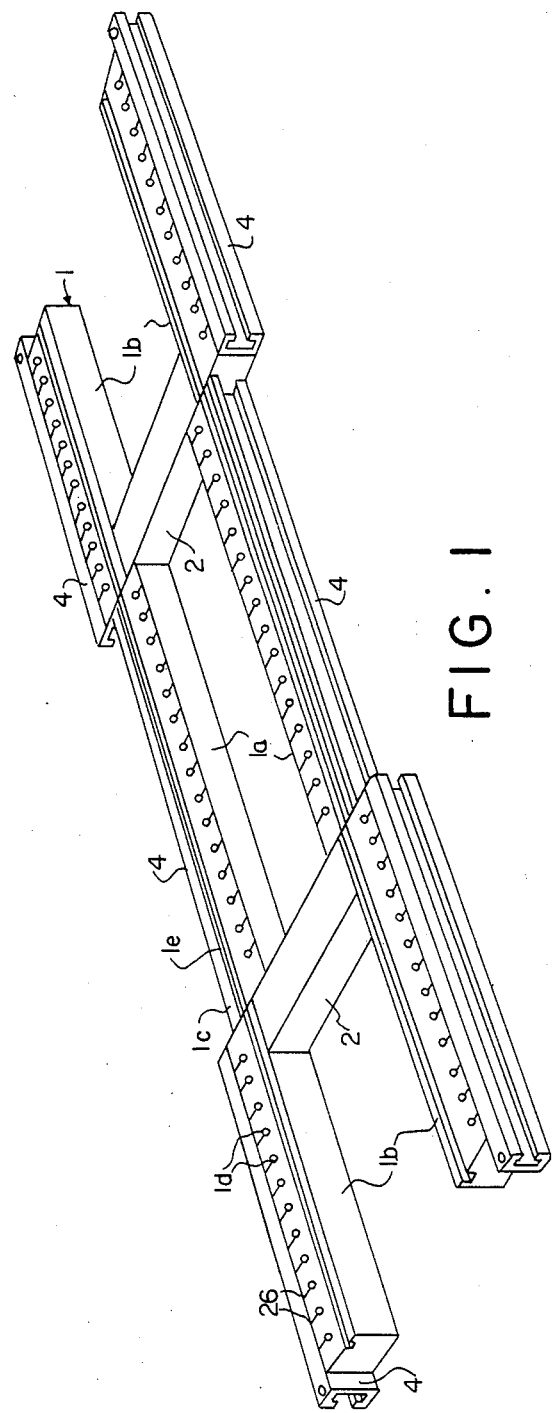
FIG. 1 is a perspective view of a modular rack according to the invention, without any accessory components or devices.
Figure 2:
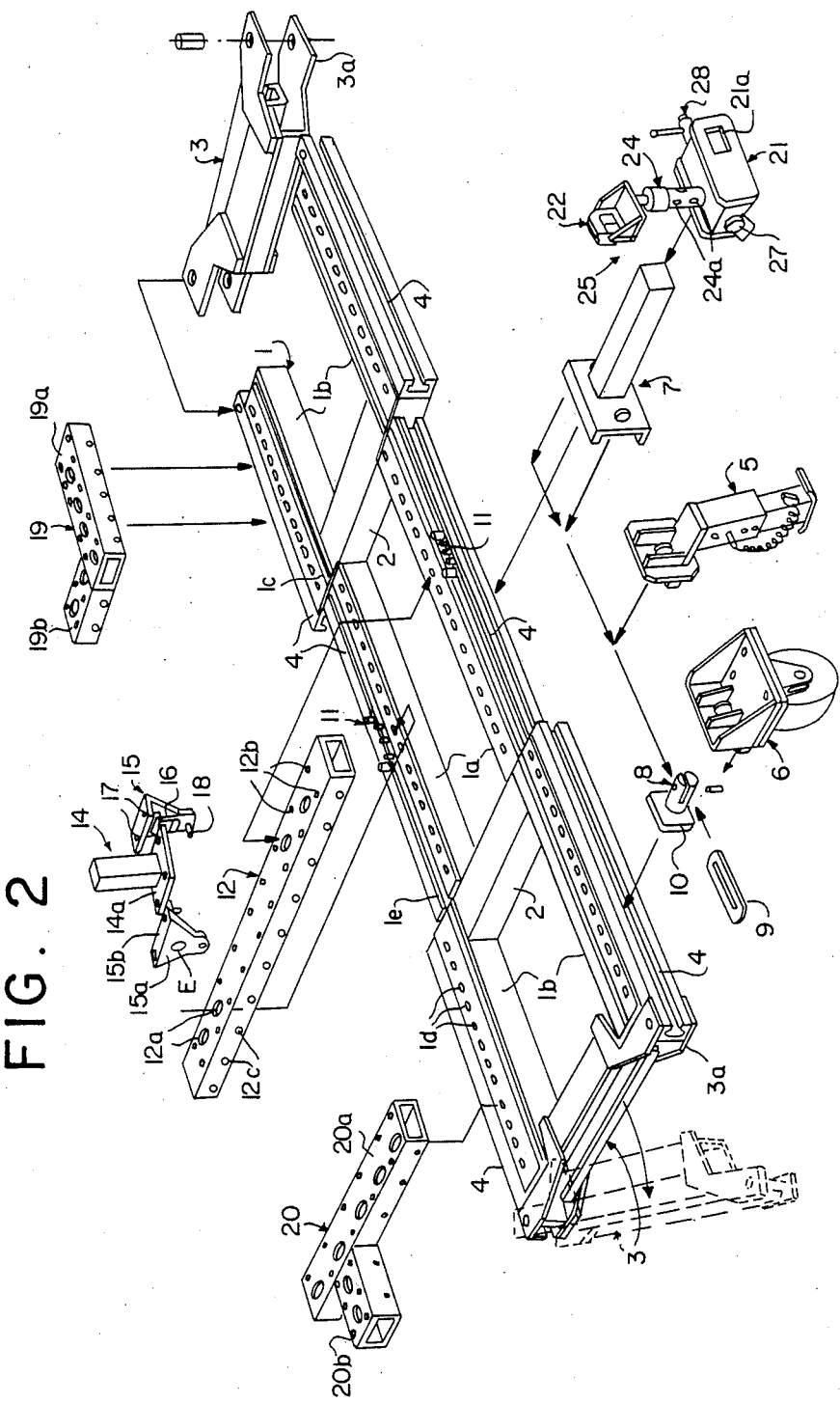
FIG. 2 is a perspective view of the modular rack of FIG. 1, additionally showing accessory components and devices in breakaway.
Figure 3:
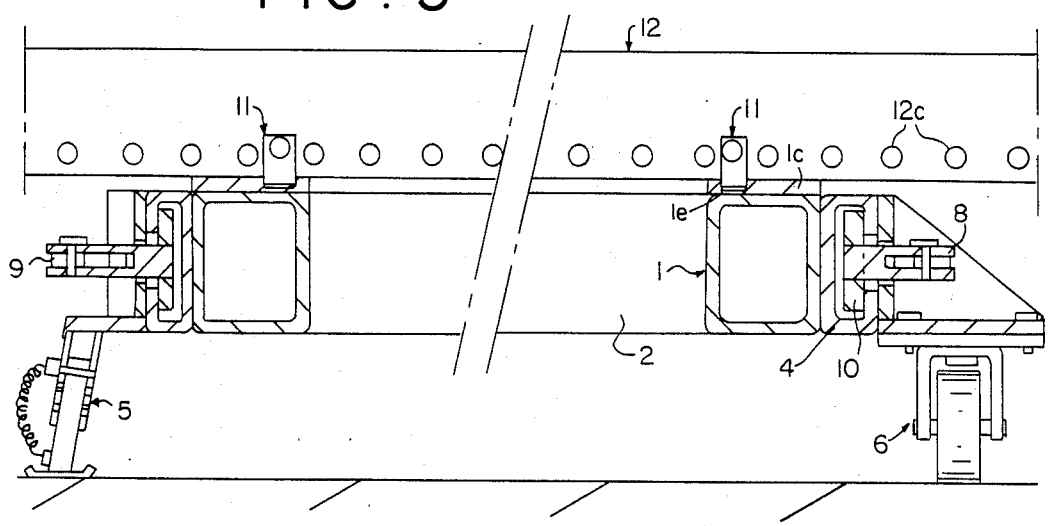
FIG. 3 is a partial cross-section illustrating, on the right, the mounting of a wheel onto the rack and, on the left, the mounting of a support leg onto the rack.

A modular rack according to the invention as shown in FIGS. 1 and 2 has two parallel side members 1 connected by cross members 2. The side members 1 and cross members 2 are made from rectangular tubing for strength and rigidity. Each of the side members 1 forms a central part 1a and end parts 1b. The central part 1a is offset inwardly from the end parts 1b. Each of the end parts 1b is attached perpendicularly at the end of one of the cross members 2 to form, when seen in plan view, a U-shaped opening. The U-shaped openings are connected to each other by the center part 1a.

Transverse ends 3 are pivotally and removably attached to the end parts 1b in order to give free access to the U-shaped openings. The transverse ends 3 provide rigidity and bracing to the end parts 1b. The transverse ends 3 have a yoke 3a which allows hinged attachment to guide rail 4 on the outside face of the end part 1b by means of a pin.

The guide rail 4 has a C-shaped cross section to enable slidable mounting and positioning of supports and accessories such as support leg 5, wheel 6, and support arm 7. The supports and accessories may be mounted on a split dowel 8 integral with a base plate 10. The base plate 10 is adapted to be inserted into and slidable along the C-shaped opening of guide rail 4. The supports and accessories are retained on the split dowel 8 with a key 9 and a pin.

The side members 1 have a top face 1c which has a plurality of tapped holes 1d at predetermined intervals along its length. The top face 1c further has a groove 1e in rectilinear alignment along its whole length. The groove 1e is adapted to receive a freely sliding support stirrup 11 fitted with running components to allow the mounting and positioning of one or more cross supports 12.

Figure 5:
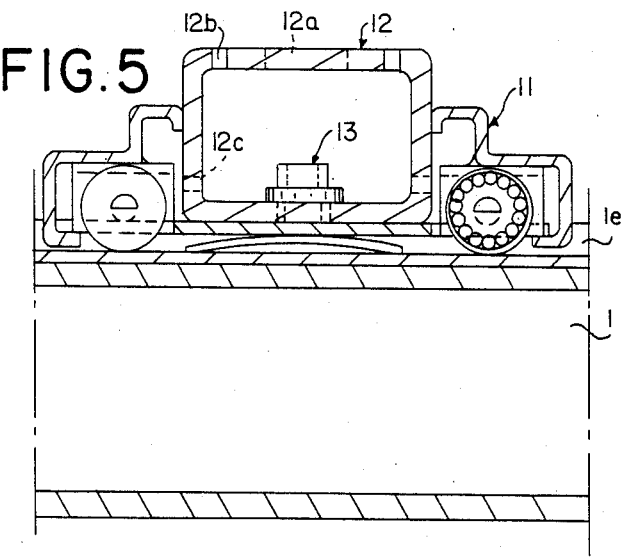
FIG. 5 is a section taken along line 5—5 of FIG. 4, and further showing a cross member being positioned and locked.
Figure 4:
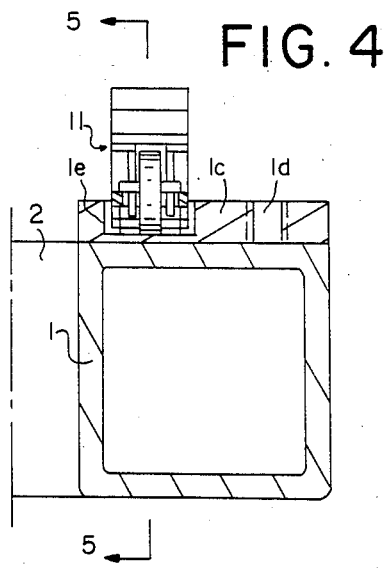
FIG. 4 is a cross-section illustrating the mounting of a support stirrup into a groove of a side member before positioning a cross member into the stirrup.

As shown in FIG. 5, the stirrups 11 have a U-shaped cross section adapted to receive the cross support 12.

The stirrups 11 are slidable along groove 1e so that cross support 12 can be positioned as desired along the length of the rack. The top face of the cross support 12 has a plurality of large openings 12a which are each in alignment with a smaller opening in the bottom face. A bolt 13 is insertable through one of the large openings 12a and is threadable in one of the tapped holes 1d for mounting the cross support 12 to the rack. It is noteworthy that under the clamping effect of the bolt 13 acting through cross support 12, the running components of the stirrup 11 are withdrawn in order to provide full and efficient locking.

Figure 6:
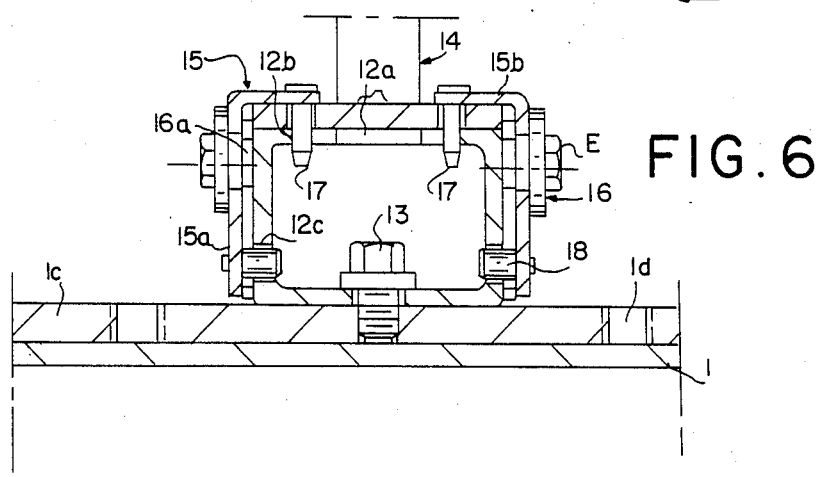
FIG. 6 is a partial cross-section showing the fixing of a support element onto a cross member.

As shown in FIGS. 2 and 6, the cross support 12 has a plurality of holes 12b in its top face. Vertical support 14 having base plate 14a is mountable on the top face of the cross support 12. A pair of clamps 15 each having eccentric system 16 fixes the vertical support 14 to the cross support 12. The clamps 15 are formed from a vertical plate 15a, bent lug 15b and centering dowels 17. The base plate 14a has a plurality of holes which are alignable with the holes 12b for insertion of the centering dowels 17.

A bottom part of the vertical plate 15a has a dowel 18 equally spaced to the centering dowels 17. The dowel 18 is insertable through one of holes 12c in a side face of the cross support 12.

An eccentric system 16 comprises a disc 16a integral with a nut E. Turning the nut E results in a wedging effect in combination with the dowels 17 and 18, and fixes the vertical support 14 onto the cross support 12. Only one quarter turn of the nut E is required to produce the wedging effect.

A first base plate 19 has unequal length legs 19a and 19b forming an L-shape. The first base plate 19 has a plurality of holes similar to cross support 12, which allow the first base plate 19 to be mounted on the side members 1 by using the clamp 15.

A second base plate 20 has unequal length legs 20a and 20b forming a T-shape. The second base plate 20 has a plurality of holes in the same manner as the cross support 12 and the first base plate 19 for mounting on the side members 1 using the clamps 15.

The first base plate 19 and second base plate 20 allow mounting of the vertical support 14 in various locations with respect to the side members 1.

Figure 7:
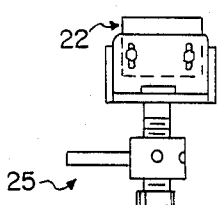
FIG. 7 is a cross-section of a clamp support box mounted at the end of a support arm according to a preferred embodiment.
Figure 8:
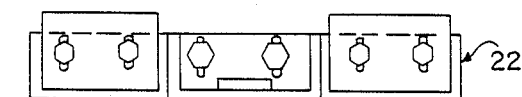
FIG. 8 is a cross-section of the clamp support box according to another embodiment.

A box 21 having mounting clamp 22 is adapted to mount on any one of the support arm 7, the cross support 12, the first base plate 19 or the second base plate 20. As shown in FIGS. 2, 7 and 8, the box 21 has an opening 21a which is dimensioned to receive the support arm 7. The opening 21a can be offset with respect to the body of the box 21 in order to provide different elevations according to the orientation of the box 21 on the support arm 7.

In a preferred embodiment as shown in FIG. 7, the body of the box 21 has mobile jaws 21b and 21c attached to springs 23 so as to be moved concomitantly by approaching or receding from a tube 24. A clamp 22 is mounted at the end of the tube 24. A height adjustment means 25 is provided to raise and lower the clamp 22. The height adjustment means 25 can be a screw and nut drive, a jack screw or other like system which, along with the box 21, allows a quick and precise height adjustment.

In another embodiment as shown in FIG. 8, the opening 21a of the box is not offset. The tube 24 is simply slide mounted in the box 21 and capable of being locked in different height positions by means, for example, of a pin 27 which can be inserted into any one of a plurality of holes 24a spaced along the length of the tube 24.

Regardless of the embodiment of the box 21, a locking means 28 fixes the box 21 onto the support component, such as support arm 7. In order to obtain a desired height of the clamp 22, an initial height is set by sliding the tube 24 to a position and locking the tube 24 with the jaws 21b and 21c or the pin 27. The height adjustment means 25 is used to very accurately set the final desired height.

According to the invention, numbers 26 are marked opposite each of the holes 1d of the side members 1 and the holes 12c of the cross support 12 and the first and second base plates 19 and 20. By using the numbers 26 it is possible to quickly and accurately position the supports and accessories onto the proper part of the rack and/or the cross support and base plates.

Those skilled in the art will understand that the rack is fitted with anchoring components according to conventional and known designs. In addition, a handle for operating a hydraulic straightening square can be fitted to the guide rail 4 of the rack to allow adjustable positioning of the straightening square.

While the advantages of the rack should be clearly apparent from the description, the following advantages are highlighted:

increased access inside the end parts of the rack allows better access to the vehicle bodywork;

the rack allows simple and quick slide positioning of attendant supports and accessories;

the supports can be quickly clamp mounted to cross supports and base plates;

the support boxes allow quick and easy adjustment of the height of the clamps; a reduction in working time, and;

the rectangular tubing used in the rack provides increased strength and rigidity.

I claim:

1. A rack for the assembly, inspection and repair of vehicle bodies, comprising:

a pair of essentially parallel side members, each of said side members forming a central part which is intermediate and offset inwardly from a pair of end parts;

a pair of cross members connecting the pair of side members, said cross members attached perpendicularly between the end parts to form a pair of U-shaped openings when seen in plan view, the U-shaped openings connected and braced at the cross members by the central part; and, a pair of transverse ends removably attached between the said end parts at the ends thereof and capable of angular pivoting in relation to one or the other of the end parts to provide free access to the corresponding U-shaped opening.

2. The rack as defined in claim 1, further comprising a guide rail attached to, or formed on, the outside face of the side members.

3. The rack as defined in claims 1 or 2, wherein the top face of the side members has a groove in rectilinear alignment along the entire length of the side members.

4. The rack as defined in claim 2, wherein the transverse ends have at least one yoke arranged to allow pivoting of the transverse ends at the end of each of the guide rails.

5. The rack as defined in claim 2, wherein the guide rail forms a C-shaped cross section adapted to receive supports and accessories.

6. The rack as defined in claim 3, further comprising at least one stirrup having a U-shaped section for receiving a cross support, the said at least one stirrup adapted to roll along one of the grooves.

7. The rack as defined in claim 6, further comprising at least one cross support riding in a pair of stirrups, a first base plate having unequal length legs forming an L-shape, and a second base plate having unequal length legs forming a T-shape, wherein each of the at least one cross support and the first and second base plates are formed from rectangular tubing.

8. The rack as defined in claim 7, further comprising at least one vertical support having a base plate and a plurality of holes formed in the base plate, at least one clamp having dowels dimensioned to engage at least one of the holes in the base plate, and an eccentric system attached to the at least one clamp, and wherein the at least one cross support, the first base plate and the second base plate have a plurality of holes in their top and side faces which are adapted to receive the dowels in the at least one clamp for relocatably mounting the vertical support.

9. The rack as defined in claim 8, wherein the at least one clamp comprises a vertical plate having a dowel which mates with vertical surfaces of the at least one cross support and the first and second base plates, a bent lug having a pair of dowels which engage a pair of the plurality of holes in the at least one cross support and the first and second base plates, and the eccentric system comprises a disk which is operable to create a wedging effect in combination with the dowels.

10. The rack as defined in claim 7, further comprising at least one support arm slidably mounted on one of the guide rails, at least one box having an opening which is adapted to receive the at least one support arm or the at least one cross support, a mounting clamp attached to the box, and means for adjusting the height of the mounting clamp, wherein the opening in the box may be offset in relation to the center of the box.

11. The rack as defined in claim 10, wherein the height adjustment means comprises a tube attached vertically beneath the mounting clamp, and mobile jaws having means for displacing the jaws in relation to each other in order to apply a clamping force to the tube.

12. The rack as defined in claim 10, wherein the height adjustment means comprises a tube attached vertically beneath the mounting clamp and slidable inside the box, the tube having a plurality of diametrical holes along its length, and a pin which is supported by the box and adapted to be inserted through any one of the plurality of holes along the length of the tube.

13. The rack as defined in claim 7, further comprising a plurality of tapped holes along the length of the side members, wherein the holes are numbered for a mating relationship with corresponding numbered holes in the at least one cross support and the first and second base plates.

14. The rack as defined in claim 1, wherein the side members are made from rectangular tubing.

* * * * *